United States Patent [19]

Fine

[11] Patent Number: 4,868,141

[45] Date of Patent: Sep. 19, 1989

[54] FLUOROBOROSILICATE GLASS

[75] Inventor: Gerald J. Fine, Corning, N.Y.

[73] Assignee: Corning Incorporated, Corning, N.Y.

[21] Appl. No.: 278,853

[22] Filed: Dec. 2, 1988

Related U.S. Application Data

[63] Continuation-in-part of Ser. No. 111,217, Oct. 22, 1987, abandoned.

[51] Int. Cl.$^4$ ............................................. C03C 13/04
[52] U.S. Cl. ...................................... 501/59; 501/37; 501/77; 501/903
[58] Field of Search ...................... 501/37, 59, 903, 77

[56] References Cited

U.S. PATENT DOCUMENTS

| | | | |
|---|---|---|---|
| 2,407,874 | 9/1946 | Fraser | 501/30 |
| 2,433,882 | 1/1948 | Armistead | 501/59 |
| 3,209,641 | 10/1965 | Upton | 350/1.1 |
| 3,437,974 | 4/1969 | Spiegler | 338/300 |
| 3,671,380 | 6/1972 | Evanston et al. | 350/96.1 |
| 3,764,354 | 10/1973 | Ritze et al. | 501/59 |
| 3,784,386 | 1/1974 | Araujo et al. | 501/59 X |
| 4,023,953 | 5/1977 | Megles, Jr. et al. | 65/86 |
| 4,102,693 | 7/1978 | Owen et al. | 501/13 |
| 4,275,951 | 6/1981 | Beales et al. | 501/37 X |

*Primary Examiner*—William R. Dixon, Jr.
*Assistant Examiner*—Karl Group
*Attorney, Agent, or Firm*—Clinton S. Janes, Jr.

[57] ABSTRACT

There are disclosed fluoroborosilicate glasses that are particularly adapted to being drawn with lead silicate core glasses to produce clad glass fibers useful in forming fiber optic bundles to be incorporated in night vision equipment. The cladding glass has a refractive index not over about 1.45 and a coefficient of thermal expansion not over about $120 \times 10^{-7}/°C$. The clad fiber has a numerical aperture approximating or equal to one.

4 Claims, No Drawings

FLUOROBOROSILICATE GLASS

This application is a Continuation-In-Part application of Ser. No. 111,217, filed Oct. 22, 1987 abandoned.

This invention is concerned with fluoroborosilicate glasses having physical properties that particularly adapt them to use as cladding glasses for clad glass fibers. A specific application is the production of fiber optic bundles for use as optical elements in night vision equipment.

These fiber optic bundles are composed of clad fibers having a high numerical aperture (N.A.), wherein the value of N.A. approaches, and desirably is equal to, one. Numerical aperture is a function of the refractive indices of two glasses employed as core and cladding glasses in an optical fiber. It is defined by the equation $$N.A. = (N_1^2 - N_2^2)^{\frac{1}{2}}$$

where $N_1$ and $N_2$ are the refractive indices of the core and cladding glasses, respectively.

It is immediately apparent that, in order to obtain a high numerical aperture, glasses having widely divergent refractive indices must be employed. However, consideration must also be given to a number of other physical properties as well. Thus, to form a strong clad fiber, free from such flaws as cracks, striae, crystals and seeds, the core and cladding glasses must be compatible during sealing, redrawing and cooling steps. This means that consideration must be given to such properties as coefficient of thermal expansion, glass softness point, and phase separation tendency.

It has been the practice, heretofore, to produce fiber optic bundles for night vision equipment by a multiple step process. A suitable core glass is cast into circular bars, and a cladding glass is drawn as tubing. A bar is then placed inside a length of tubing, and the glasses are redrawn as clad cane. This clad cane is packed into new bundles with other pieces of clad cane and redrawn again. After the redraw step is repeated a number of times, the resulting bundles are cut and polished on either end. They are then used as either faceplates or inverters (after twisting 180°) in night vision goggles.

Glass requirements are stringent. In addition to a high numerical aperture, it is desirable, but not critical, that the glasses have relatively similar viscosities, generally about $10^4 - 10^6$ poises, at an appropriate redraw temperature. The relative thermal expansions of each glass must be compatible with forming as clad cane. Finally, the glasses must not be susceptible to devitrification, or reaction with each other, during redraw.

PURPOSES

One purpose of the invention is to simplify the rather tedious procedure heretofore used in forming fiber optic bundles.

Another purpose is to provide cladding glasses having properties such that clad fibers can be drawn directly from adjacent glass melts.

A further purpose is to provide a family of fluoroborosilicate cladding glasses that are compatible with lead silicate core glasses having high refractive indices.

A still further purpose is to provide fiber optic fibers having a numerical aperture equal to or approaching one.

Yet another purpose is to provide a family of fluoroborosilicate glasses having a unique combination of properties including a refractive index not over 1.45, a linear coefficient of thermal expansion over the temperature range of 25°-300° C. of not over $120 \times 10^{-7}/°C.$, a softening point below 600° C., and a viscosity at the liquidus of not under 40,000 poises.

A further purpose is to provide a clad glass fiber having a numerical aperture equal to or approaching one, and being composed of a core glass and a cladding glass wherein the cladding glass has a refractive index not over about 1.45 and a coefficient of thermal expansion not more than $30 \times 10^{-7}/°C.$, and preferably not more than $10 \times 10^{-7}/°C.$, greater than the core glass.

SUMMARY OF THE INVENTION

In furtherance of these and other apparent purposes, an aspect of my invention is a family of fluoroborosilicate glasses having compositions which, in weight percent, consist essentially of 35-52% $SiO_2$, 8-23% $Al_2O_3$, the $SiO_2 + Al_2O_3$ being at least 53%, 10-23% $B_2O_3$, 15-19% $K_2O$, the $B_2O_3 + Al_2O_3$ being not over 36%, 0-8% $Na_2O$, $+ Al_2O_3$ being not over 36%, 0-8% $Na_2O$, 0-5% alkaline earth metal oxides (RO), and containing by analysis 6-12% F, the glasses having refractive indices not over about 1.45 and linear coefficients of thermal expansion not over about $120 \times 10^{-7}/°C.$ Preferably, the cladding glass consists essentially of 35-52% $SiO_2$, 8-13% $Al_2O_3$, 17-23% $B_2O_3$, 15-17% $K_2O$, 6-9% F, 0-5% alkaline earth metal oxides (RO) and 0-8% $Na_2O$. However, $Li_2O$, and refractory oxides such as $Zr_2O_2$, should be avoided.

In another aspect, my invention is a clad fiber having a numerical aperture equal to or approximating one, and wherein the cladding glass is a fluoroborosilicate having a composition that, in weight percent, consists essentially of 35-52% $SiO_2$, 8-23% $Al_2O_2$, the $SiO_2 + Al_2O_3$ being at least 53%, 10-23% $B_2O_3$, 15-19% $K_2O$, the $B_2O_3 + Al_2O_3$ being not over 36%, 0-8% $Na_2O$, 0-5% alkaline earth metal oxides (RO) and containing by analysis 6-12% F, the glass having a refractive index not over about 1.45 and coefficient of thermal expansion not over about $120 \times 10^{-7}/°$ C.

Preferably, the cladding glass consists essentially of 35-52% $SiO_2$, 8-13% $Al_2O_3$, 17-23% $B_2O_3$, 15-17% $K_2O$, 6-9% F, 0-5% alkaline earth metal oxides (RO) and 0-8% $Na_2O$, the cladding glass having a refractive index not over about 1.45 and a coefficient of thermal expansion that is not over $10 \times 10^{-7}/°C.$ greater than that of the core glass.

The core glass may be a lead silicate glass having a refractive index of at least 1.76. Lead silicate glasses particularly suitable as core glasses consist essentially of, in percent by weight, 63-72% PbO, 26-32% $SiO_2$, 0-6% BaO, the PbO+BaO content being 66-72%, 0-2% CaO, the BaO+CaO being 0-6%, 0-5% $Al_2O_3$, and at least one of the alkali metal oxides selected from not over 5% $Na_2O$ and not over 3% $K_2O$, and 0-2% of $As_2O_3$, the glass having a refractive index of 1.76-1.78.

The invention further contemplates a night vision device embodying a fiber optic bundle composed of clad fibers wherein the cladding glass is a composition that, in weight percent, consists essentially of 35-52% $SiO_2$, 8-23% $Al_2O_3$, the $SiO_2 + Al_2O_3$ being at least 53%, 10-23% $B_2O_3$, 15-19% $K_2O$ the $B_2O_3 + Al_2O_3$ being not over 36%, 0-8% $Na_2$, 0-5% alkaline earth metal oxides (RO) and containing by analysis 6-12% F, the glass having a refractive index not over about 1.45 and coefficient of thermal expansion not over about $120 \times 10^{-7}/°C$.

Preferably, the cladding glass consists essentially of 35–52% $SiO_2$, 8–13% $Al_2O_3$, 17–23% $B_2O_3$, 15–17% $K_2O$, 6–9% F, 0–5% alkaline earth metal oxides (RO) and 0–8% $Na_2O$, the cladding glass having a refractive index not over about 1.45 and a coefficient of thermal expansion that is not over $10 \times 10^{-7}/°C$. greater than that of the core glass.

PRIOR LITERATURE

An article by Fraser and Upton, in the *Journal of the American Ceramic Society*, 27, 121–128 (1944) and entitled "Optical Fluor-Crown Glasses", reports studies on the effect of composition variations on optical properties of glasses used in optical elements. The composition components varied were silica, alumina, boric oxide, potash and fluorine.

U.S. Pat. No. 2,407,874 (Fraser) discloses fluor-crown optical glasses containing silica, alumina, boric oxide, alkali metal oxide and fluorine.

U.S. Pat. No. 2,433,882 (Armistead) discloses glasses colored green with cobalt and iron halides, containing oxides of silicon, boron, aluminum and sodium and/or potassium, and having a minor addition of fluoride.

U.S. Pat. No. 3,671,380 (Ali et al.) discloses cladding glasses for clad fibers. The cladding glasses have relatively low refractive indices and are composed of $B_2O_3$, $SiO_2$, $Al_2O_3$ and $K_2O$.

U.S. Pat. No. 3,764,354 (Ritze) discloses fluoroborosilicate glasses having low refractive indices and optical paths independent of temperature. The glasses consist essentially of $SiO_2$, $B_2O_3$, $Al_2O_3$, alkali oxide plus fluoride, $Sb_2O_3$ and additional fluorine.

U.S. Pat. No. 4,102,693 (Owen et al.) discloses photochromic borosilicate glasses having dispersed silver halide crystals and composed of $SiO_2$, $B_2O_3$, $Al_2O_3$ and alkali metal oxide ($R_2$).

GENERAL DESCRIPTION

The present invention arose from a search for cladding and core glasses having compatible properties that would enable their being drawn directly from melts as clad fiber having a numerical aperture equal to or approximating one.

Such a drawing process is sometimes referred to as a double crucible, or double orifice, drawing process. It is referred to, for example, in connection with resistor cane production in U.S. Pat. No. 3,437,974 (Spiegler). It is illustrated in U.S. Pat. No. 3,209,641 (Upton), and, in somewhat more complex, double clad tubing production, in U.S. Pat. No. 4,023,953 (Megles, Jr. et al.).

Briefly, in simple form, a core glass may be melted in, or transferred in molten form to, a cylindrical chamber having a drawing orifice. This chamber is surrounded by a second, concentric, cylindrical, chamber wall spaced from the first chamber. The cladding glass is melted in, or transferred to, this second chamber which also has a drawing orifice concentric with and surrounding the first orifice. The two glasses are allowed to flow out simultaneously and unite to form the desired clad cane as drawn.

The properties required in my new cladding glasses for drawing as clad cane are: (1) similarity in viscosity to a usable core glass at least within a range of forming temperatures, (2) low liquidus temperature and high viscosity at the liquidus temperature, (3) low refractive index, (4) reaction-free interface when applied as a cladding and (5) thermal expansion compatible with typical high lead silicate glasses.

A tubing glass, available from Corning Glass Works under Corning Code 7052 and heretofore used as cladding, has a refractive index of about 1.48. However, that index requires a core glass with a refractive index of at least 1.79 to provide a N.A. of one. Glasses having such high indices are known, but do not generally lend themselves to drawing as fiber or cane. Also, such glasses tend to have expansion and viscosity characteristics that negate compatibility in clad articles.

A number of glass systems have relatively low refractive indices, but are subject to other deficiencies. Borate glasses are notorious for poor durability, as are fluorophosphates. The latter also have high thermal expansion coefficients and low liquidus viscosities. Fused silica is difficult to form even by itself.

The fluoroborosilicate glasses, reported as optical element glasses, looked promising. However, initial melts tended to phase separate and/or exhibit rather high expansion coefficients. I have now found that the several requirements can be met by employing lead silicate glasses as core glasses with a narrowly limited range of fluoroborosilicate cladding glasses.

The lead silicate core glasses generally have refractive indices of at least about 1.76 and thermal expansion coefficients on the order of at least $75 \times 10^{-7}/°C$. and preferably near $100 \times 10^{-7}/°C$. Glasses having particular utility for present redraw purposes consist essentially of, in weight percent, 63–72% PbO, 26–32% $SiO_2$, 0–6% BaO, the PbO+BaO content being 66–72%, 0–2% CaO, the BaO+CaO being 0–6%, 0–5% $Al_2O_3$, and at least one of the alkali metal oxides selected from not over 5% $Na_2O$ and not over 3% $K_2O$ and 0–2% $As_2O$ the glass having a refractive index of about 1.76–1.78.

My new cladding glasses must meet several requirements. Initially, as previously indicated, a numerical aperture of one requires a large difference in the refractive indices of the core and cladding glasses. For example, a core glass of about 1.77 requires a cladding glass with an index not over about 1.45.

The liquidus of the cladding glass should be at least below the drawing temperature of the core glass. Further, the viscosities of the core and cladding glasses should be reasonably close at the forming or drawing temperature. Thus, it is generally desirable that the two glasses have viscosities of about $10^4 - 10^6$ poises at the drawing temperature.

In general, optimum strength in a clad fiber requires that the coefficient of thermal expansion of the cladding glass be no more than $10 \times 10^{-3}/°C$. units above that of the core glass. Preferably, the coefficient is equal to or below that of the core glass. Accordingly, I prefer cladding glasses having compositions consisting essentially of, in percent by weight as calculated on an oxide basis, 35–52% $SiO_2$, 8–13% $Al_2O_3$, 17–23% $B_2O_3$, 15–17% $K_2O$, 6–9% F and 0–8% $Na_2O$ and 0–5% alkaline earth metal oxides (RO).

However, I have found that, if a lesser degree of strength in the clad fiber can be tolerated, a surprising degree of mismatch can exist. Accordingly, cladding glasses may have a coefficient of thermal expansion as high as $120 \times 10^{-7}/°C$. providing this is not over $30 \times 10^{-7}/°C$. units above the coefficient of the core glass and the ratio of the core glass diameter to the thickness of the cladding glass is not over about 20:1. In this broader aspect then, my glasses may consist, in percent by weight, essentially of 35–52% $SiO_2$, 8–23% $Al_2O_3$, the $SiO_2+Al_2O_3$ being at least 53%, 10–23% $B_2O_3$, 15–19% $K_2O$ the $B_2O+Al_2O_3$ being not over 36%, 0–8% $Na_2O$, 0–5% alkaline earth metal oxides (RO), and containing by analysis 6–12% F.

These composition limits on the several glass components should be observed with reasonable care. Thus, at least 6% fluorine, by analysis, is required to maintain a softening point below 600° C. and a low refractive index below 1.45. In general, not more than about 12% can be maintained in the glass, any excess being lost by volatilization. In order to provide analyzed contents of 6–12% F, about 10–15%, or more, should be incorporated in the glass batch. It will be appreciated, of course, that the amount lost by volatilization will depend somewhat on other constituents, and on melting conditions.

$Al_2O_3$ apparently serves to stabilize the fluorine and maintain it in the glass during melting. However, increasing $Al_2O_3$ hardens the glass and increases the liquidus. Hence, $Al_2O_3$ should not exceed 23%. The total content of $SiO_2+Al_2O_3$ should exceed 53% to restrain the expansion coefficient.

$B_2O_3$ tends to lower the expansion coefficient, as well as soften the glass, but may cause excessive F volatilization. However, with contents below about 10%, the glasses tend to phase separate and become opals. Above 23% $B_2O_3$, F volatilization precludes analyzed F contents above 6%.

$K_2O$ softens the glass, but amounts over about 19% unduly increase the refractive index and the expansion coefficient. Amounts below 15% tend to make the glass too hard.

In general, low coefficients of thermal expansion are favored by employing low $Al_2O_3$, $K_2O$ and F contents and high $B_2O_3$ content. Accordingly, my preferred compositions contain 8–13% $Al_2O_3$, 15–17% $K_2O$, 6–9% F and 17–23% $B_2O_3$, 0–8% $Na_2O$ and 0–5% alkaline earth metal oxides (RO).

SPECIFIC EXAMPLES

The invention is further illustrated with reference to compositions for several cladding glasses as set forth in TABLE I. The compositions are given on an oxide basis, with fluorine being shown separately on an elemental basis. However, it will be appreciated that the fluorine is incorporated in a glass batch as fluorides, e.g., aluminum and/or potassium fluorides, and enters the glass structure in place of oxygen. The compositions are given in parts by weight. Since each composition totals approximately 100, the individual amounts may be taken as percentages by weight.

A glass batch was mixed corresponding to each composition. The batches were melted in covered platinum crucibles for four hours at temperatures varying from 1250°–1400° C. as required for successful melting. The melts were poured into molds to form 6"×6" (15 cm×15 cm) patties which were annealed. The patties were divided into sections and prepared for measurement of various physical properties. The observed data are also recorded in TABLE I. R.I. represents refractive index. C.T.E. represents coefficient of thermal expansion expressed in terms of $\times 10^{-7}/°C$. S.P. represents softening point in terms of °C. The visual appearance of each sample is also recorded illustrating the absence of devitrification or opalization.

TABLE I

|  | 1 | 2 | 3 | 4 | 5 | 6 |
|---|---|---|---|---|---|---|
| $SiO_2$ | 46.6 | 46.7 | 42.8 | 36.8 | 49.1 | 39.6 |
| $Al_2O_3$ | 9.0 | 15.0 | 19.6 | 21.7 | 12.5 | 15.0 |
| $B_2O_3$ | 21.0 | 15.0 | 11.3 | 15.5 | 12.5 | 21.0 |
| $K_2O$ | 15.3 | 15.3 | 15.8 | 15.8 | 17.8 | 15.3 |
| F (anal.) | 6.8 | 8.0 | 10.3 | 10.1 | 8.0 | 7.8 |
| R.I. | 1.45 | 1.45 | 1.45 | 1.45 | 1.45 | 1.45 |
| C.T.E. | 99 | 104 | 112 | 111 | 107 | 112 |
| S.P. | 571 | 592 | 585 | 539 | 591 | 537 |
| Appearance | clear | clear | clear | clear | clear | clear |

By way of illustrating how small deviations in composition outside the prescribed limits can alter properties, compositions and properties for six additional glasses are shown in TABLE II below.

TABLE II

|  | 7 | 8 | 9 | 10 | 11 | 12 |
|---|---|---|---|---|---|---|
| $SiO_2$ | 41.6 | 39.7 | 32.7 | 40.6 | 36.4 | 44.0 |
| $Al_2O_3$ | 15.0 | 16.3 | 25.8 | 18.8 | 18.7 | 16.3 |
| $B_2O_3$ | 13.0 | 14.1 | 15.5 | 18.8 | 18.7 | 9.8 |
| $K_2O$ | 20.3 | 16.6 | 15.8 | 13.5 | 17.7 | 16.6 |
| F (anal.) | 10.3 | 13.2 | 10.1 | 8.3 | 8.5 | 13.2 |
| R.I. | 1.45 | 1.43 | — | 1.46 | 1.45 | — |
| C.T.E. | 132 | 145 | — | 90 | 123 | — |
| S.P. | 554 | 517 | — | 612 | 528 | — |
| Appearance | clear | clear | opal | clear | clear | opal |

TABLE III sets forth compositions for four glasses (Examples 13–16) that are particularly suitable for core glasses, as well as for two glasses (Examples 17 and 18) that are not suitable. Also included are physical properties as in TABLES I and II plus annealing point (Ann.) and strain point (Str.) in °C. and Internal Liquidus (Int. Liq.) also in °C.

TABLE III

|  | 13 | 14 | 15 | 16 | 17 | 18 |
|---|---|---|---|---|---|---|
| $SiO_2$ | 30.5 | 29.4 | 27.5 | 28.3 | 27.0 | 27.5 |
| PbO | 63.7 | 64.6 | 63.6 | 64.3 | 62.6 | 63.7 |
| BaO | 5.6 | 1.8 | 5.6 | 3.1 | 5.5 | 5.6 |
| CaO | — | 0 | 0 | 0.9 | 0 | 2.8 |
| $Na_2O$ | — | 1.6 | 3.1 | 1.6 | 0 | 0 |
| $K_2O$ | — | 2.4 | 0 | 1.6 | 4.6 | 0 |
| $As_2O_3$ | 0.2 | 0.2 | 0.2 | 0.2 | 0.2 | 0.2 |
| Soft (°C.) | 605 | 535 | 531 | 546 | 548 | 620 |
| Ann. (°C.) | 473 | 396 | 401 | 412 | 416 | 489 |
| Str. (°C.) | 437 | 363 | 370 | 379 | 384 | 456 |
| CTE ($\times 10^{-7}/°C.$) | 75 | 99 | 100 | 94 | 104 | 82 |
| R.I. | 1.77 | 1.770 | 1.770 | 1.765 | 1.770 | 1.785 |
| Int. Liq. (°C.) | — | 720 | 703 | 707 | 819 | 744 |

The high $K_2O$ content in Example 17, and the high CaO content in Example 18, appear to sharply increase the liquidus temperature. This interfered with drawing clad fiber which was produced by melting core and cladding glasses in a double crucible apparatus generally similar to that illustrated in the Upton patent mentioned earlier.

To illustrate the mismatch in thermal expansion coefficients that can be tolerated under some circumstances, a lead silicate glass having the composition of Example 13 in TABLE III was melted in the inner chamber. The cladding glass was melted in the outer chamber, and had the composition shown in TABLE I as Example 2. The drawing temperature for the clad fiber was about 820° C.

The higher expansion coefficient of the cladding glass presented the potential problem of cracking. Accordingly, the ratio of core diameter to cladding thickness was varied during the run. Since a ratio of 16:1 was specified for product purposes, the ratio was set initially somewhat higher at 20:1. When no cracking or other defect was observed, the ratio was increased to 25:1. At this ratio some cracking was observed. This confirms that an expansion mismatch can be tolerated, but that it is desirable to minimize it if other requirements permit. No reaction at the interface between the glasses was observed.

I claim:

1. A fluoroborosilicate cladding glass having a composition, in weight percent, consisting essentially of 35–52% $SiO_2$, 8–23% $Al_2O_3$, the $SiO_2+Al_2O_3$ being at least 53%, 10–23% $B_2O_3$, 15–19% $K_2O$, the $B_2O_3+Al_2O_3$ being not over 36%, 0–8% $Na_2O$, 0–5% alkaline metal oxides (RO), and containing by analysis 6–12% F, the glass having a refractive index not over about 1.45 and a coefficient of thermal expansion of not over $120\times10^{-7}/°C$.

2. A fluoroborosilicate cladding glass in accordance with claim 1 further containing up to 8% $Na_2O$.

3. A fluoroborosilicate cladding glass in accordance with claim 1 consisting essentially of 35–52% $SiO_2$, 8–13% $Al_2O_3$, 17–23% $B_2O_3$, 15–17% $K_2O$, 0–8% $Na_2O$ and 6–9% F, the $SiO_2+Al_2O_3$ being at least 53% and the $B_2O_3+Al_2O_3$ being not over 36%, 0–8% $Na_2O$ and 0–5% alkaline earth metal oxides (RO).

4. A fluoroborosilicate cladding glass in accordance with claim 1 consisting essentially of 46.6% $SiO_2$, 9.0% $Al_2O_3$, 21% $B_2O_3$, 15.3% $K_2O$ and 6.8% F.

* * * * *